W. A. DORSEY.
CAR MOVER.
APPLICATION FILED JUNE 29, 1915.
1,215,634.
Patented Feb. 13, 1917.
2 SHEETS—SHEET 2.
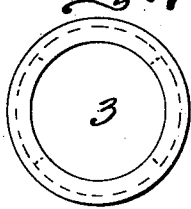
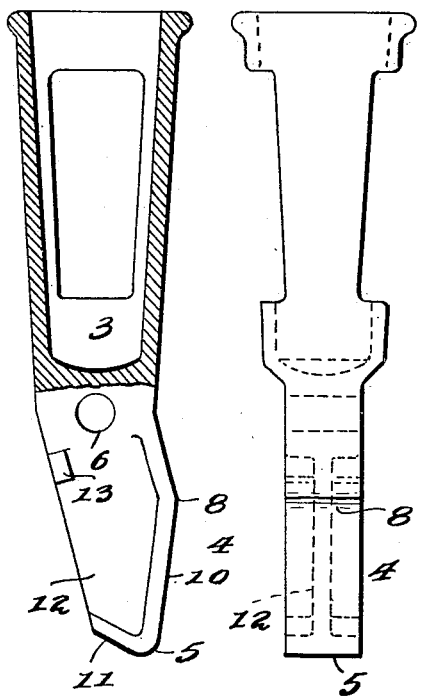
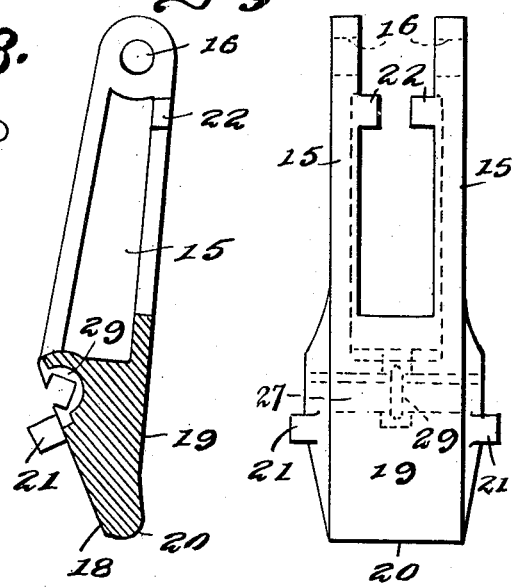
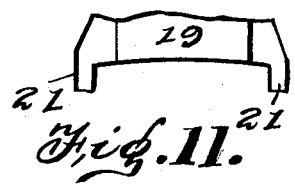
Witnesses
Inventor
Walter A. Dorsey
By H. H. Bliss
Attorney

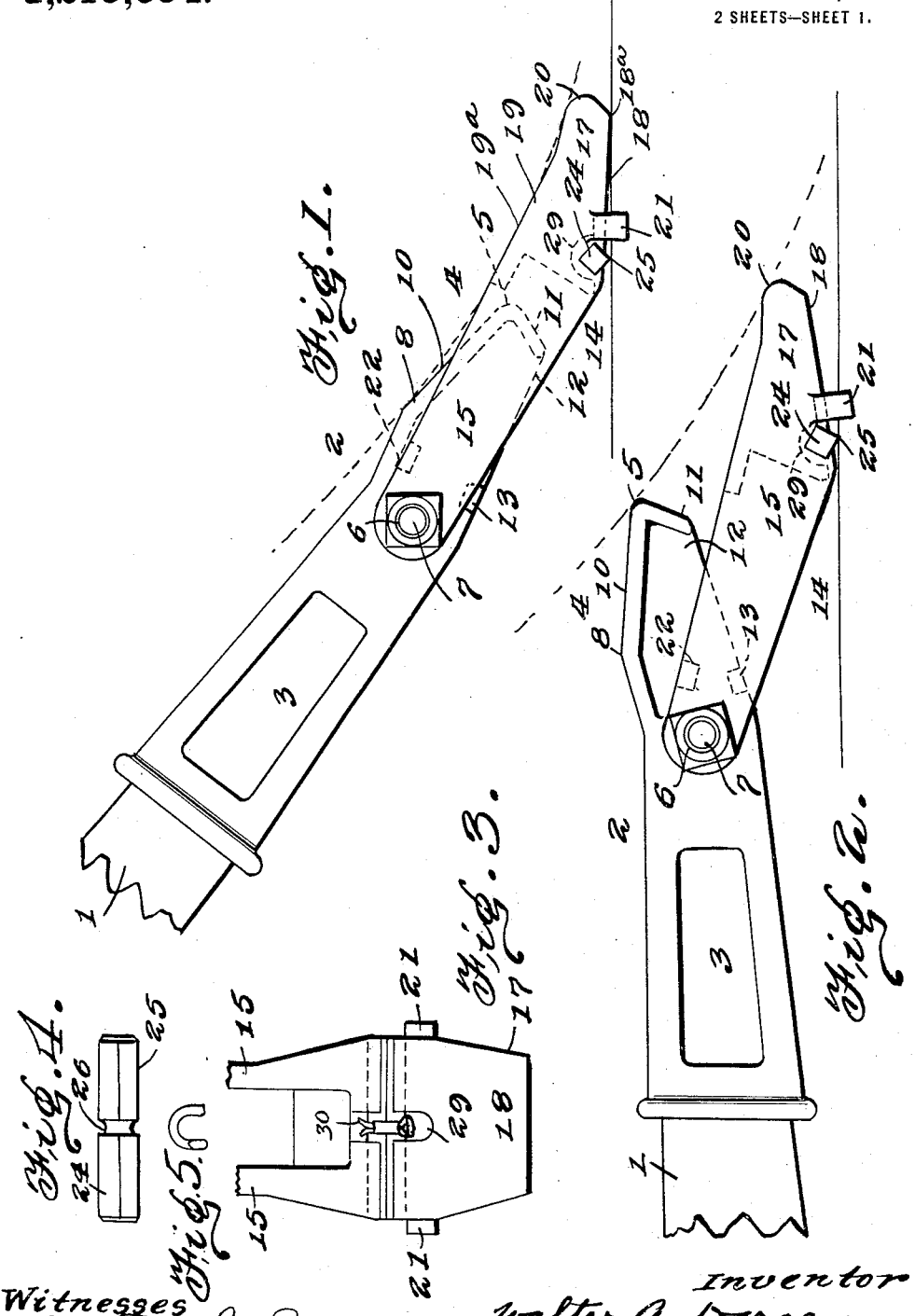

UNITED STATES PATENT OFFICE.

WALTER A. DORSEY, OF COLUMBUS, OHIO, ASSIGNOR TO THE BONNEY-FLOYD COMPANY, OF COLUMBUS, OHIO, A CORPORATION OF OHIO.

CAR-MOVER.

1,215,634.  Specification of Letters Patent.  Patented Feb. 13, 1917.

Application filed June 29, 1915. Serial No. 37,089.

*To all whom it may concern:*

Be it known that I, WALTER A. DORSEY, a citizen of the United States, residing at Columbus, in the county of Franklin and State of Ohio, have invented certain new and useful Improvements in Car-Movers, of which the following is a specification, reference being had therein to the accompanying drawing.

This invention relates to improvements in car movers, the manually operable lever devices that are specially adapted for moving railway cars by causing their wheels to roll along the track when pried by means of the levers.

The object is to provide a lever device of this class which will have the number of parts reduced to the minimum, and each of which shall be so constructed that a powerful pushing or rolling effort can be exerted by means of the tool.

Figure 1 is a side view of a car moving lever embodying my improvements, the parts being in the positions assumed when they are thrust under the edge of a wheel just prior to commencing a movement.

Fig. 2 is a side view showing the same, with the parts in the position occupied just before a power-applying downward movement of the lever terminates.

Fig. 3 is a bottom plan view of the pinch bar or short lever.

Fig. 4 is a view of the fulcrum device detached.

Fig. 5 is a view of the lock pin detached.

Figs. 6 to 11 show detail parts separated from each other.

In the drawings 1 indicates the handle part of the lever and 2 the socket end of the metallic attachment, the main lever as an entirety comprising these parts 1 and said attachment 2. The handle part is thrust into the socket as shown at 3. The forwardly extended end of this lever is indicated as a whole by 4, which is provided with an aperture at 6 for receiving the pivot bolt 7. It has a top flange or plate part 8 and a downward extending web 12. The flange 8 has a surface 10 adapted to provide rolling contact with the tire of a car wheel, and at 11 this flange is turned backward so that the nose 5 at the end of the lever will be free to rock while contacting with the wheel, this inward and downward turned part 11 also greatly increasing the strength of the metal at the end. At 13 the lever is provided with a stop on one, or each, side of the web part 12.

The pinch bar or supplemental lever is indicated by 14. It is formed with a solid base part 17 from which there extend backward two arms 15 which are spaced sufficiently to permit the pinch bar to straddle the forward part of the main lever. These arms are apertured at 16 to receive the pivot bolt 7 which secures the two levers together. The lower surface 18 of the solid part 17 of the pinch bar is arranged to bear upon the top of the rail at $18^a$ at points near the front end. The upper surface 19 is shaped so that when the parts are in their initial position, as in Fig. 1, this upper surface will contact at $19^a$ with the rim of a wheel, the forward part of the surface being more or less remote from the peripheral line. At the very end of this solid part of the pinch bar there is a rounded nose at 20 which bears at all times, during operation, upon the periphery of the wheel and is shaped so as to provide a rolling contact of the wheel with the lever. At 21, 21 lugs are provided, cast integral with the part 17, these being spaced apart sufficiently to permit them to project down by the side of the tread of the rail and serve as a sliding guide for the pinch bar and to prevent its being displaced laterally. At 22 there is a stop on one, or on each, side of the supplemental lever, adapted to impinge on the flange part 8 of the main lever when moving in one direction and upon the stops 13 when moving in the opposite direction.

A fulcrum device is shown at 24. It consists of a hardened steel pin angular in section and formed with sharp corner edges 25. The solid part 17 of the pinch bar is cast with a transversely extending passageway of cross dimensions substantially equal to those of the fulcrum pin, and the latter can be passed transversely through the lever and fitted snugly in place. The chamber, however, is open on the lower side so that one of the corner edges 25 will project below the lever and lie in a position where it can rest upon and bite into the top surface of the rail; the opening in the lower surface of the lever being shown at 27.

29 is a semi-circular groove in the metal of the part 17 extending around the chamber which receives the pin, and at 26 there is a corresponding semi-circular groove in the pin 24. When the pin 24 is inserted into position the lock pin 30 is introduced into the groove and is of a diameter equal to or slightly less than that of the grooves 26 and 29 when brought together to register. The curved pin locks the fulcrum pin against lateral displacement. The lock pin 30 is preferably similar to a cotter key and the projecting ends, after the pin is inserted, can be spread apart sufficiently to prevent the lock pin from being dislodged.

The top surface 10 of the main lever is shaped so as to provide a projection at 8 which extends relatively forward when the parts are in their initial position, as in Fig. 1. This is the first bearing point of the main lever upon the wheel. It is close to the pivot pin 7 and makes the forward arm of the lever very short at the time the first impulse is imparted manually to the handle 1. Consequently great power can be applied to start the wheel and the car. After the inertia of rest has been overcome and rolling motion of the wheel commences, and the handle part of the lever starts to descend, the application of power continues as the periphery of wheel rolls along the surface 10. Soon after the main lever has commenced its movement the pinch bar or supplemental lever 14 begins also to descend at its outer end and the nose part 20 also begins to rise with the rolling wheel.

The operator with slight efforts pushes the tool as an entirety into the position shown in Fig. 1, easily forces down the handle of the main lever; then raises it again, slips it forward again, and repeats the pressing downward of the lever, and rapidly rolls the wheel, and advances the car.

The lugs 21 obviate the necessity of exerting care in positioning the pinch bar, and the fulcrum pin 24 gives firm engagement with the rail. If the exposed edge of this pin should become dulled all that is necessary is to remove the lock pin 30, draw out the fulcrum pin, turn it part way around to expose a sharp edge and again lock it in position.

What I claim is:

1. The combination with the main lever having the forward operating end formed with the wheel engaging shoulder 8, relatively near the pivot axis of the lever, the contact surface 10 extending from said shoulder to the end of the lever, and the stops, of the vibratable wheel-contacting pinch bar movable vertically with the main lever and engaging the wheel independently of said lever and having the solid forward end 17 with the rounded nose 20, the guides 21 fitting the sides of the rail, and the detachable and adjustable fulcrum pin, substantially as described.

2. The combination of the main lever having the forward projecting end with the upper wheel engaging face adapted to provide rolling contact with the wheel and extending from the end of the lever to a transverse line near the pivot, and the vertically vibratable pinch bar or supplemental lever connected by a pivot near the upper end of said rolling surface to the main lever and formed with the forwardly projecting solid wheel-contacting vertically movable nose part, and having the rail-engaging fulcrum pin therein, and rail-engaging guide lugs rocking around said fulcrum pin.

In testimony whereof, I affix my signature, in presence of two witnesses.

WALTER A. DORSEY.

Witnesses:
HARRY E. WEST,
WILLARD GOODMAN.

Copies of this patent may be obtained for five cents each, by addressing the "Commissioner of Patents, Washington, D. C."